(12) United States Patent
Chan et al.

(10) Patent No.: US 7,644,221 B1
(45) Date of Patent: Jan. 5, 2010

(54) SYSTEM INTERFACE UNIT

(75) Inventors: Paul G. Chan, Oakland, CA (US); Ricky C. Hetherington, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 131 days.

(21) Appl. No.: 11/103,319

(22) Filed: Apr. 11, 2005

(51) Int. Cl.
G06F 13/36 (2006.01)

(52) U.S. Cl. .................... 710/315; 710/306; 710/314

(58) Field of Classification Search ............ 710/315, 710/306, 314
See application file for complete search history.

(56) References Cited

U.S. PATENT DOCUMENTS

| | | | |
|---|---|---|---|
| 5,784,630 A * | 7/1998 | Saito et al. ............... 712/30 |
| 5,878,268 A | 3/1999 | Hagersten | |
| 5,968,167 A | 10/1999 | Whittaker et al. | |
| 6,134,622 A * | 10/2000 | Kapur et al. ............ 710/310 |
| 6,205,506 B1 * | 3/2001 | Richardson ............. 710/310 |
| 6,275,906 B1 | 8/2001 | Nunez et al. | |
| 6,704,841 B2 * | 3/2004 | Chaudhry et al. ......... 711/137 |
| 6,745,272 B2 * | 6/2004 | Owen et al. ............. 710/107 |
| 6,747,949 B1 * | 6/2004 | Futral .................... 370/231 |
| 6,748,479 B2 | 6/2004 | Sano et al. | |
| 6,842,828 B2 | 1/2005 | Blankenship | |
| 6,963,561 B1 * | 11/2005 | Lahat .................... 370/356 |
| 2005/0091121 A1 * | 4/2005 | Charney et al. ......... 705/26 |

* cited by examiner

*Primary Examiner*—Mark Rinehart
*Assistant Examiner*—Jeremy S Cerullo
(74) *Attorney, Agent, or Firm*—Rory D. Rankin; Meyertons Hood Kivlin Kowert & Goetzel, P.C.

(57) ABSTRACT

A processor including an integrated system interface unit configured to manage multiple I/O interfaces and multiple protocols. A processor includes a plurality of processing cores, a cache comprising a plurality of banks, and a system interface unit coupled to the processing cores and the cache. The system interface unit includes an inbound unit configured to receive inbound transactions from a first I/O unit and a second I/O unit, and an outbound unit configured to convey outbound transactions to either the first I/O unit or the second I/O unit. Each of the first and second I/O units is configured to support different protocols. Prior to conveying transaction data to the system interface, the first I/O unit and second I/O units reformat transaction data to conform to a common format. The system interface receives and stores transaction data in either queues dedicated for cacheable transactions or queues dedicated for non-cacheable transactions. In addition, each of the I/O units may also indicate in the common format whether a given transaction is to be ordered with respect to other transactions. The system interface may separately store ordered transactions from those which are non-ordered.

23 Claims, 12 Drawing Sheets

SYSTEM INTERFACE UNIT

BACKGROUND OF THE INVENTION

1. Field of the Invention

The invention relates to computing systems and, more particularly, to managing multiple I/O transactions in a multicore multiprocessing system.

2. Description of the Related Art

In recent years, efforts have been made to further increase the performance of microprocessors by incorporating more and more functionality onto a single chip. While such an approach may provide performance enhancements, a number of complications may arise. For example, when multiple independent I/O devices of different bus architectures, with no knowledge of caches, are embedded within a single processor with multiple independent memory caches, certain problems concerning coherency must be addressed. Ideally, each I/O device should see a consistent unified view of memory, each cache should treat all I/O transactions as if they came from the same I/O device, all caches should remain coherent, and messages to various threads should not get out of order.

Accordingly, an effective method and mechanism for managing I/O transactions in a chip multiprocessor is desired.

SUMMARY OF THE INVENTION

These and other embodiments, variations, and modifications will become apparent upon consideration of the following description and associated drawings.

A processor including an integrated system interface unit configured to manage multiple I/O interfaces and multiple protocols is contemplated. In one embodiment, the processor includes a plurality of processing cores, a cache comprising a plurality of banks, and a system interface unit coupled to both the processing cores and the cache. The system interface unit includes an inbound unit configured to receive inbound transactions from a first I/O unit and a second I/O unit, and an outbound unit configured to convey outbound transactions to either the first I/O unit or the second I/O unit. In one embodiment, each of the first and second I/O units is configured to support different protocols and/or bus architectures. Prior to conveying transaction data to the system interface, the first I/O unit and second I/O units reformat transaction data to conform to a predetermined common format. The system interface receives and stores transaction data in queues dedicated for cacheable transactions or queues dedicated for non-cacheable transactions. In addition, each of the I/O units may also indicate in the common format whether a given transaction is to be ordered with respect to other transactions. The system interface may separately store ordered transactions from those which are non-ordered.

Also contemplated is a common format for transaction data which includes an identifier supplied by a requesting I/O unit. The supplied identifier flows through the processing pipelines and may accompany any responses which are returned to the original requestor. The requestor may then utilize the identifier to match the response to the corresponding request.

In one embodiment, each of the I/O units are integrated with the system interface unit and processing cores in a single chip or package. Also contemplated is a packet header decode unit in the system interface which examines packet headers and routes cacheable read requests to one of the plurality of banks.

Other embodiments and features are contemplated and will become apparent upon reference to the accompanying description and figures.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
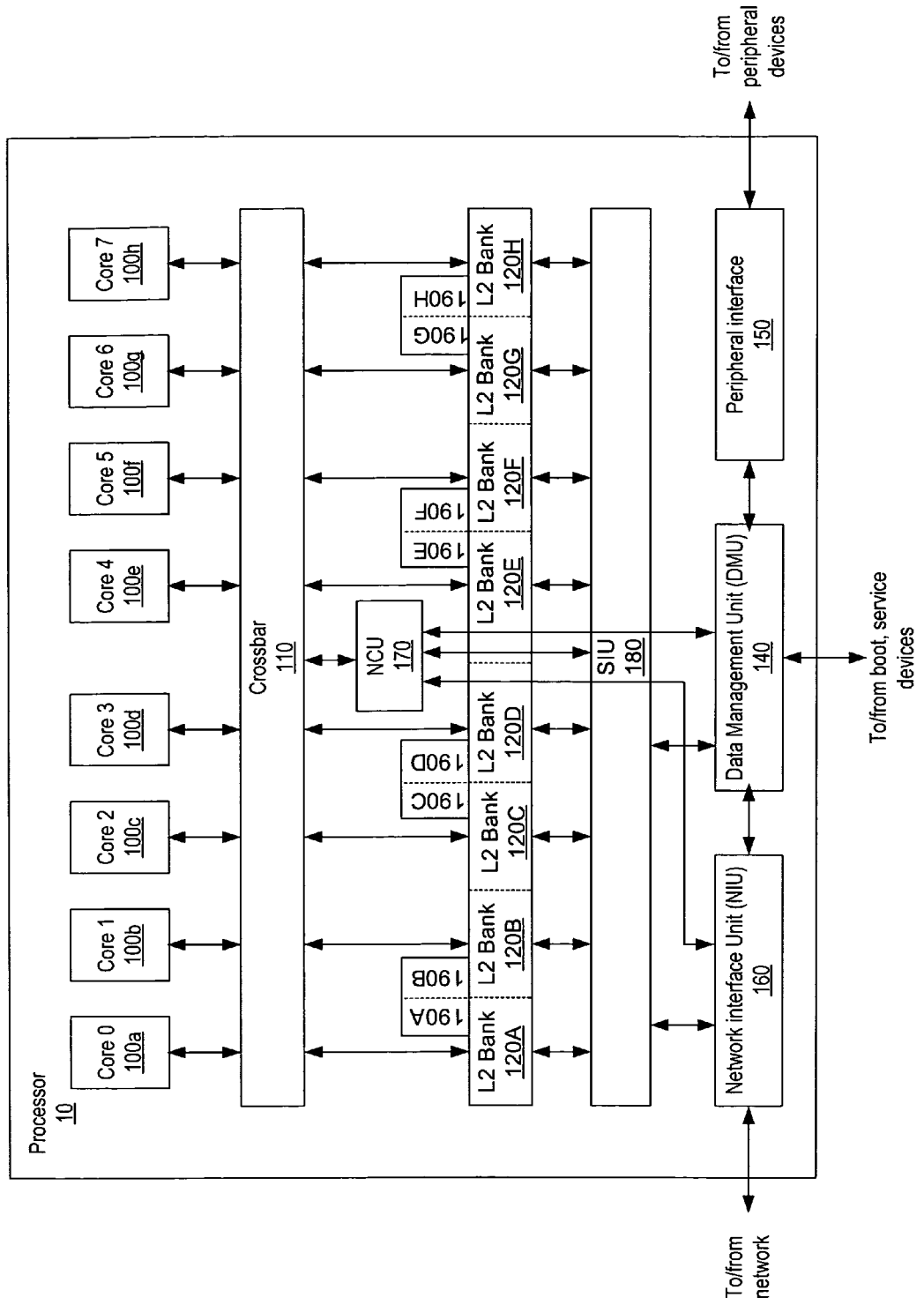
FIG. 1 is a block diagram illustrating one embodiment of a multi-threaded multi-core processor.

A block diagram illustrating one embodiment of a multi-threaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. In the embodiment shown, L2 cache 120 includes eight banks 120A-120H. L2 cache 120 is coupled to one or more memory control units 190A-190H, which are coupled in turn to one or more banks of system memory (not shown). Additionally, crossbar 110 couples cores 100 to data management unit (DMU) 140, which is in turn coupled to a peripheral interface 150 and a network interface 160. As described in greater detail below, DMU 140, peripheral interface 150, and network interface 160 may respectively couple processor 10 to boot and/or service devices, peripheral devices, and a network. In addition, L2 cache 120 is coupled to a system interface unit (SIU) 180 which is in turn coupled to network interface 160 and DMU 140. Further, SIU 180 is also coupled to crossbar 110 via non-cacheable unit (NCU) 170.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa. In addition, non-cacheable unit 170 may be configured to queue requests and/or responses which are deemed non-cacheable.

L2 cache 120 may be configured to cache instructions and data for use by cores 100. In the illustrated embodiment, L2 cache 120 may be organized into eight separately addressable banks 120A-120H that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory control unit(s) 190 may be configured to manage the transfer of data between L2 cache 120 and system memory, for example in response to L2 fill requests and data evictions. In the embodiment shown, multiple instances of memory control unit 190 are implemented, with each instance 190A-190H being configured to control a respective bank of system memory. Memory control unit 190 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. DMU 140 may be configured to provide a central interface for such sources to exchange data with cores 100 and/or L2 cache 120 via crossbar 110. In some embodiments, DMU 140 may be configured to coordinate Direct Memory Access (DMA) transfers of data between network interface 160 or peripheral interface 150 and system memory via memory interface 130. In addition to coordinating access between crossbar 110 and other interface logic, in one embodiment DMU 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

In one embodiment, SIU 180 is configured to provide an interface for the network interface 160 and the DMU 140 to access memory via the L2 cache 120. In addition, the SIU 180 may provide an interface for non-cacheable transactions between the network interface 160 or DMU 140 and cores 100.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
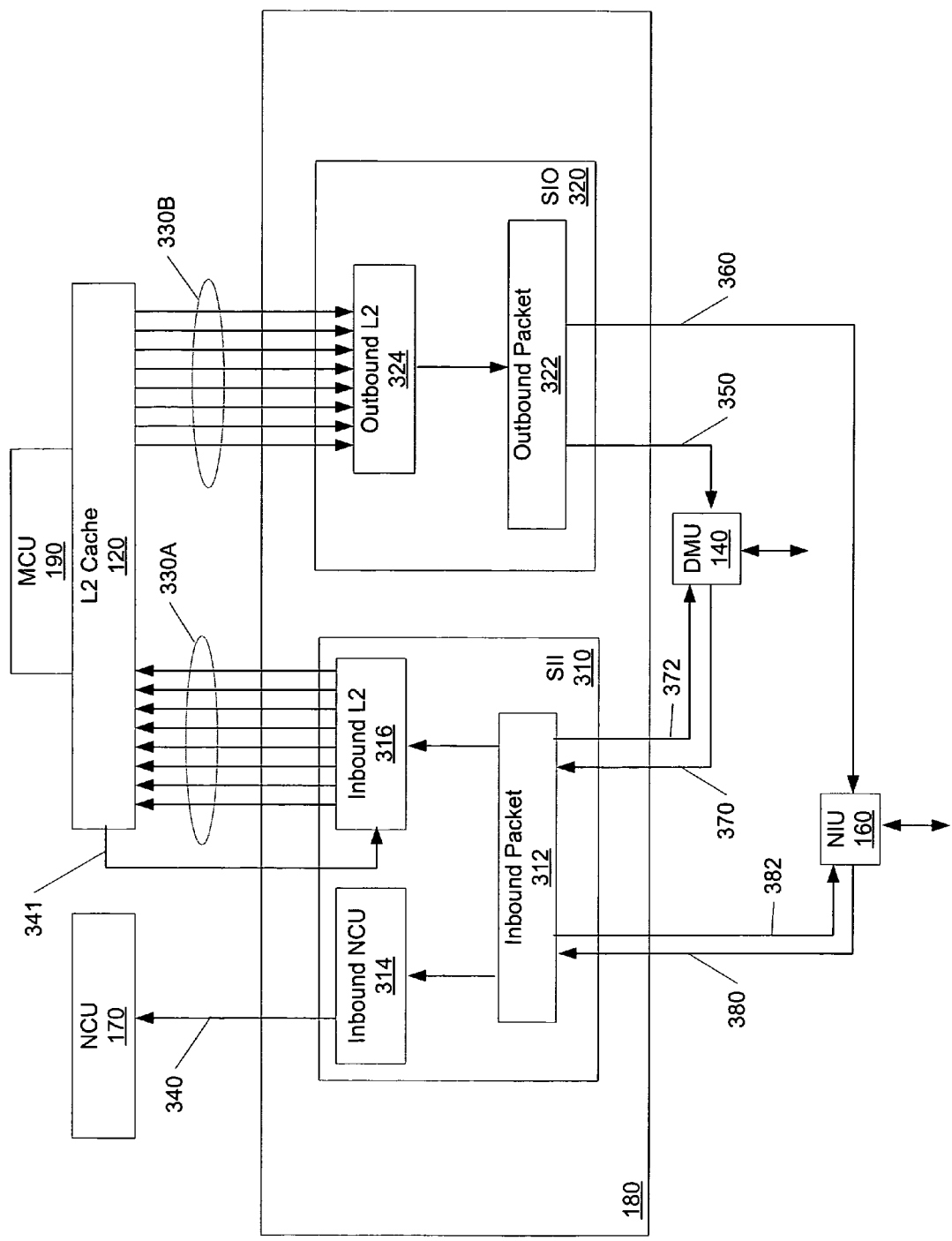
FIG. 2 is a block diagram illustrating one embodiment of a system interface unit within the processor of FIG. 1.

Turning now to FIG. 2, one embodiment of the SIU 180 is shown. In one embodiment, the SIU 180 is partitioned, physically and/or logically, into at least 2 parts based upon the direction of flow. A system interface inbound (SII) 310 partition is for inbound traffic and a system interface outbound (SIO) 320 partition is for outbound traffic. As used herein, inbound traffic refers to traffic coming into the processor 10 and outbound traffic refers to traffic leaving the processor 10. Generally speaking, all inbound traffic continues inbound through the SIU 180 until it reaches either the NCU 170 or an L2 bank 120. Outbound traffic from either the NCU 170 or L2 120 leaves the SIU 180 in the outbound direction. In one embodiment, NCU 170 and L2 banks 120 do not send traffic to each other through the SIU 180. In addition, DMU 140 and NIU 160 do not send traffic toward each other through the SIU 180. Because the L2 banks 120 have their own paths through the memory controllers 190 to memory, the SIU 180 may generally view each L2 bank as a slave device. In one embodiment, the SIU 180 assumes the L2 cache 120 never initiates requests to SIU 180. In addition, network interface unit 160 blocks are generally seen as master devices pulling from and pushing data to the L2 cache 120 only.

In one embodiment, all traffic through the SIU 180 uses a packet transfer interface. In the embodiment shown, SII 310 includes an inbound packet unit 312 coupled to receive requests from the DMU 140 via bus 370 and NIU 160 via bus 380. Inbound packet unit 312 is further coupled to convey received requests to an inbound NCU unit 314 and an inbound L2 unit 316. Inbound NCU unit 314 is coupled to NCU 170 via bus 340, and inbound L2 unit 316 is coupled to L2 cache 120 via buses 330A. In one embodiment, buses 330A comprise a separate bus for each of the banks in the L2 cache 120. The system interface outbound partition 320 is shown to include an outbound packet unit 322 and an outbound L2 unit 324. Outbound L2 unit 324 is coupled to receive data from L2 cache 120 via buses 330B. Outbound L2 unit 324 is coupled to outbound packet unit 322. Outbound packet unit 322 is coupled to convey data to DMU 140 via bus 350 and NIU 160 via bus 360.

In one embodiment, each packet is 1 or 2 consecutive address/header cycles immediately followed by 0 or more consecutive data/payload cycles. In the embodiment shown, the SII 310 includes an inbound packet unit 312 for processing inbound packets, and SIO includes an outbound packet unit 322 for processing outbound packets. In addition, SII 310 includes an inbound NCU unit 314 for handling non-cacheable inbound traffic, and an inbound L2 unit 316 for handling inbound traffic headed for the L2 cache 120. SIO 320 includes an outbound L2 unit 324 for handling outbound traffic received from L2 cache 120.

In one embodiment, interfaces between the SIU 180 and the DMU 140 and NIU 160 are 128 bits wide and are parity protected. In the example shown, each of buses 350, 360, 370 and 380 are 128 bits wide. To control packet flow, side band signals 372 and 382 are utilized. Generally speaking, inbound packet unit 312 is configured to process received packets and steer corresponding data toward either the NCU 170 or the L2 cache 120. In the embodiment shown, inbound L2 unit 316 is configured to concurrently handle packets for each of the corresponding L2 banks 120A-102H in the L2 cache 120.

Each of the inbound packet unit 312, inbound NCU unit 314, and inbound L2 unit 316 are configured to queue received requests prior to forwarding the requests. In one embodiment, the inbound packet unit 312 includes two dedicated queues for each of the DMU 140 and the NIU 160. Inbound L2 unit 316 may include eight queues, each corresponding to a different bank of the L2 cache 120, and the inbound NCU unit 314 may generally include a single queue. Of course it is to be understood that other configurations and embodiments than that shown in FIG. 2 are both possible and are contemplated.

In the example shown, a "credit" based system is utilized to control the flow of packets through the SIU 180. Each of the DMU 140 and NIU 160 must generally have a credit in order to convey a request to the SIU 180. Credits may generally indicate the availability of space in a queue for receiving a request from one of the DMU 140 or the NIU 160 and may be used to prevent queue overflow. As particular queues are dedicated for use by one or the other of the DMU 140 and NIU 160, credits for a requester (DMU 140 or NIU 160) will correspond to queues for use by the corresponding requester. In one embodiment, sideband signals 372 and 382 are used to indicate queue availability (credits) to each of DMU 140 and NIU 160, respectively. In one embodiment, each of the dedicated queues within the inbound packet unit 312 includes a fixed number of entries. During system initialization or configuration, each of DMU 140 and NIU 160 may have a counter for each of its two queues initialized to indicate the number of queue entries which are available. When a requestor (DMU 140 or NIU 160) conveys a request to inbound packet unit 312, a corresponding counter within the requestor is decremented to indicate a reduction in the number of credits available to the requestor. When the inbound packet unit 312 conveys a packet to either of the inbound NCU unit 314 or the inbound L2 unit 316, thereby freeing up a queue entry, the SII 310 conveys an indication via either sideband signal 372 or 382 to a corresponding requestor (DMU 140 or NIU 160) that an entry has been freed and the requester now has an additional credit available. In a similar manner, the L2 cache 120 may utilize a sideband signal(s) 341 to indicate available credits to inbound L2 unit 316 for use in submitting requests to the L2 cache 120.

Figure 3:
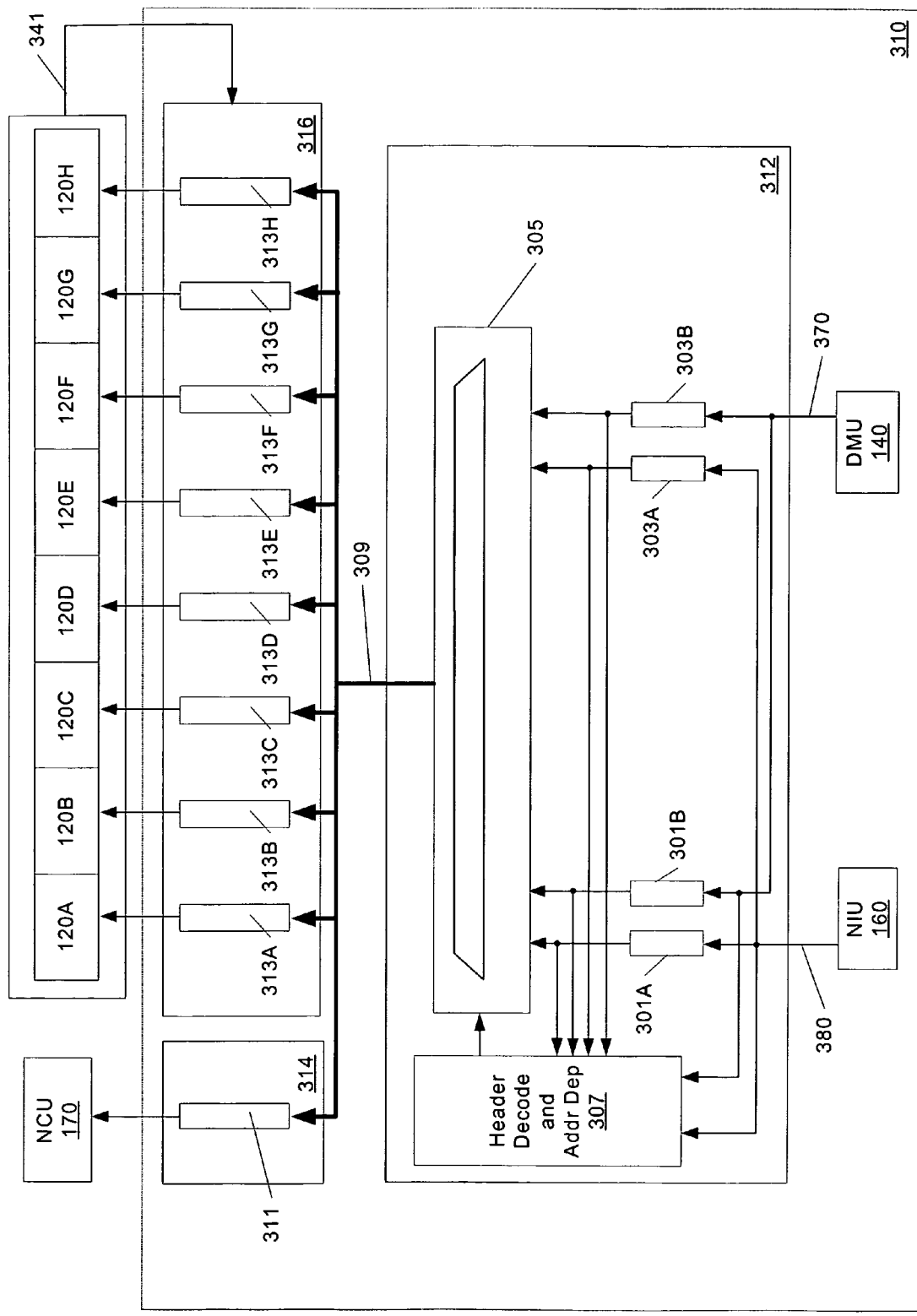
FIG. 3 depicts one embodiment of an inbound unit of the system interface unit in FIG. 2.

Turning now to FIG. 3, one embodiment of the SII 310 is shown. FIG. 3 depicts each of NIU 160 and DMU 140 as being coupled to two queues within the inbound packet unit 312. NIU 160 is coupled to queue 301A and 303A, and DMU 140 is coupled to queues 301B and 303B. In one embodiment, queues 301A-301B are utilized for storing requests which are ordered with respect to one another. Queues 303A-303B may be utilized for storing requests which are not necessarily ordered with respect to other received requests. Queues 301 may generally be referred to as ordered queues for storing ordered requests, and queues 303 may generally be referred to as bypass queues for storing non-ordered requests.

Also shown in FIG. 3, SII 312 includes circuitry 305 configured to select and convey data from one of queues 301 or 303 via bus 309 to either the inbound L2 unit 316 or the inbound NCU unit 314. In one embodiment, inbound NCU unit 314 includes a single queue 311 and inbound L2 unit 316 includes eight queues 313A-313H—each coupled to a separate bank of the L2 cache 120. In one embodiment, each of queues 313 are coupled to a respective L2 bank 120 via a 32 bit bus. Similarly, queue 311 may be coupled to NCU 170 via a 32 bit bus.

In one embodiment, the protocols and format of data utilized by each of the NIU 160 and the DMU 140 may be different from that required by processing cores 100 and/or memory subsystem of the processor 10. For example, as described above, in one embodiment, NIU 160 comprises an Ethernet interface, and DMU 140 comprises a PCI Express interface. Accordingly, NIU 160, DMU 140, and SIU 180 may be configured to reformulate the formats and protocols of the NIU 160 and DMU 140 to a common format and protocol compatible with the processor 10. To that end, each of NIU 160 and DMU 140 may generate packets according to a predetermined format for received transactions and convey those packets to SIU 180. SIU 180 may in turn decode the received packets, convert the requests included therein to corresponding cache subsystem commands, tag the requests to indicate the L2 cache bank to which it should be routed, and store the converted requests in one of the inbound L2 queues 313 or the inbound NCU queue 311.

In one embodiment, each of the NIU 160 and DMU 140 are configured to form packets for conveyance to SIU 310 according to a common format. SIU 310 may then receive and process packets conforming to the common format. As the SIU 310 may be configured to receive and process packets according to a common format, in one embodiment the SIU 310 is not generally aware of the type of I/O interface (e.g., Ethernet or PCI express) which is conveying a particular packet. Accordingly, in one embodiment, either or both of the NIU 160 or DMU 140 may be replaced by an I/O unit of a different type. Such different interfaces may then generally be configured to create packets according to a common format for conveyance to the SIU 310. In an embodiment wherein the NIU 160 comprises an Ethernet interface and the DMU 140 comprises a PCI express interface, the packet oriented nature of the protocols associated with each of the I/O interfaces 140 and 160 may serve to facilitate operation with the SIU 310. In such an embodiment, modification of received packets to conform to a common format may be readily achieved.

It is noted that while in the embodiment shown, and in the discussion generally, both the NIU 160 and the DMU 140 are integrated as part of the processor 10 on a single device or package. However, in alternative embodiments, each of the I/O interfaces 140 and 160 may not be integrated as part of the processor 10 and SIU 310 may generally form the processor I/O interface. In such an embodiment, additional I/O interface components may be coupled to the processor via the interface provided by the SIU 310. In various embodiment, such additional components may be directly modified to support the SIU 310 interface packet format, or off the shelf components may be utilized with the addition of additional "glue" logic to manage packet format transformations.

As mentioned above, SII 312 may include two queues for each of the NIU 160 and the DMU 140. In one embodiment, each of the queues 301 and 303 are configured as circular queues and a current read pointer is used to keep track of a current entry. Other approaches to management of the queues are possible and are contemplated. As noted above, queues 301 may be utilized for storing packet data which is to be ordered with respect to other packet data. Consequently, data which has been in one of queues 301 longer is generally processed before other data within the same queue. In contrast, data which need not be ordered with respect to other data may be stored in one of queues 303. In one embodiment, for ease of implementation, data stored in one of queues 303 may be processed in the order in which it is received. However, data stored in queues 303 need not generally be ordered with respect to other transaction or packet data.

It is noted that various I/O interfaces and protocols may support transactions which need not be ordered with respect to other transactions. For example, the PCI express specification may support such bypass transactions. Additionally, received Ethernet traffic may often be addressed to entirely different regions of memory and may not require ordering as such. Consequently, certain packets may include an indication that they may be stored in a bypass queue rather than an ordered queue. For example, in one embodiment, the common packet format utilized by the SIU 310 may include a flag (e.g., a single bit) which is used to indicate whether or not the packet must be ordered. In various embodiments, a particular I/O interface (140, 160) may be explicitly configurable to enable or not enable the use of bypass packets. In one embodiment, processor 10 may be configurable to disallow bypass packets. In such an embodiment, SIU 312 may be configured to (logically) combine bypass queues 303 with ordered queues 301 to form larger ordered queues. Numerous such alternatives are possible and are contemplated.

Also included in SIU 312 is header decode logic and address dependency logic 307. The logic depicted by unit 307 may comprise one or more logical units as appropriate. As seen in the example, logic unit 307 is coupled to unit 305, each of queues 301 and 303, input 380 from NIU 160, and input 370 from DMU 140. In one embodiment, unit 307 includes header decode logic configured to examine packet headers in each of queues 301 and 303 and route the packets accordingly. For example, in response to determining a packet header include an indication corresponding to a non-cacheable transaction, the packet may be routed to queue 311. Alternatively, in response to determining a packet is addressed to a particular memory location, the packet may be routed to a queue 313 which corresponds to a particular L2 cache bank.

In addition to header decode logic, unit 307 may also include address dependency logic configured to detect queue entries with packets which are addressed to a same memory location. Such detection may be important in the event an external I/O device conveys packets to both an ordered queue 301 and a bypass queue 303 which are addressed to a particular memory location. For example, SIU 312 may receive a first packet addressed to a location A which indicates it may be placed in a bypass queue 303. Subsequently, SIU 312 may receive a second packet addressed to location A which indicates it is to be placed in an ordered queue 301. SIU 312 may then receive a third packet addressed to location A which indicates it may be placed in a bypass queue 303. Because the second packet indicates it is to be ordered, allowing the third packet to bypass the second packet could cause a problem. Such a series of events could be the result of programming error, data corruption (e.g., a flipped bit which indicates whether or not a packet is to be ordered), or by design. In any event, SIU 312 may be configured to detect such situations and prevent the third packet from being processed before the second packet.

In one embodiment, dependency logic 307 is configured to examine the destination address of packets within the queues 301 and 303. If a packet is received and placed in a bypass queue 303, dependency logic 307 determines whether there exists a packet in an ordered queue which is addressed to the same location. If such a packet in an ordered queue is detected, the packet in the bypass queue may be tagged (or some other type of indication stored) which indicates a dependency on the packet in the ordered queue exists. Subsequently, the packet in the bypass queue may not be allowed to be processed until the corresponding packet in the ordered queue has been processed. Generally speaking, address dependency logic may check for dependencies between ordered and bypass queues for a given I/O unit. For example, the logic 307 may check for dependencies between queue 301A and 301B, and logic 307 may check for dependencies between queue 303A and 303B. In alternative embodiments, logic 307 may be configured to perform dependency checking between all of the queues 301 and 303.

In one embodiment, each bypass queue 303 entry may include a dependency field for storing an indication that an address dependency exists with a packet in an ordered queue as described above. In one embodiment, the field may include a single bit which indicates a dependency exists, and may also store an entry number in the ordered queue which contains the corresponding packet. When the packet in the bypass queue is ready for processing (e.g., the bypass queue read pointer reaches the packet), the dependency field is checked to determine whether a dependency exists. If a dependency exists, the read pointer of the ordered queue is checked. If the read pointer of the ordered queue has not reached the indicated entry yet, then the packet in the ordered queue has not yet been processed and the packet in the bypass queue cannot be processed.

Figure 4:
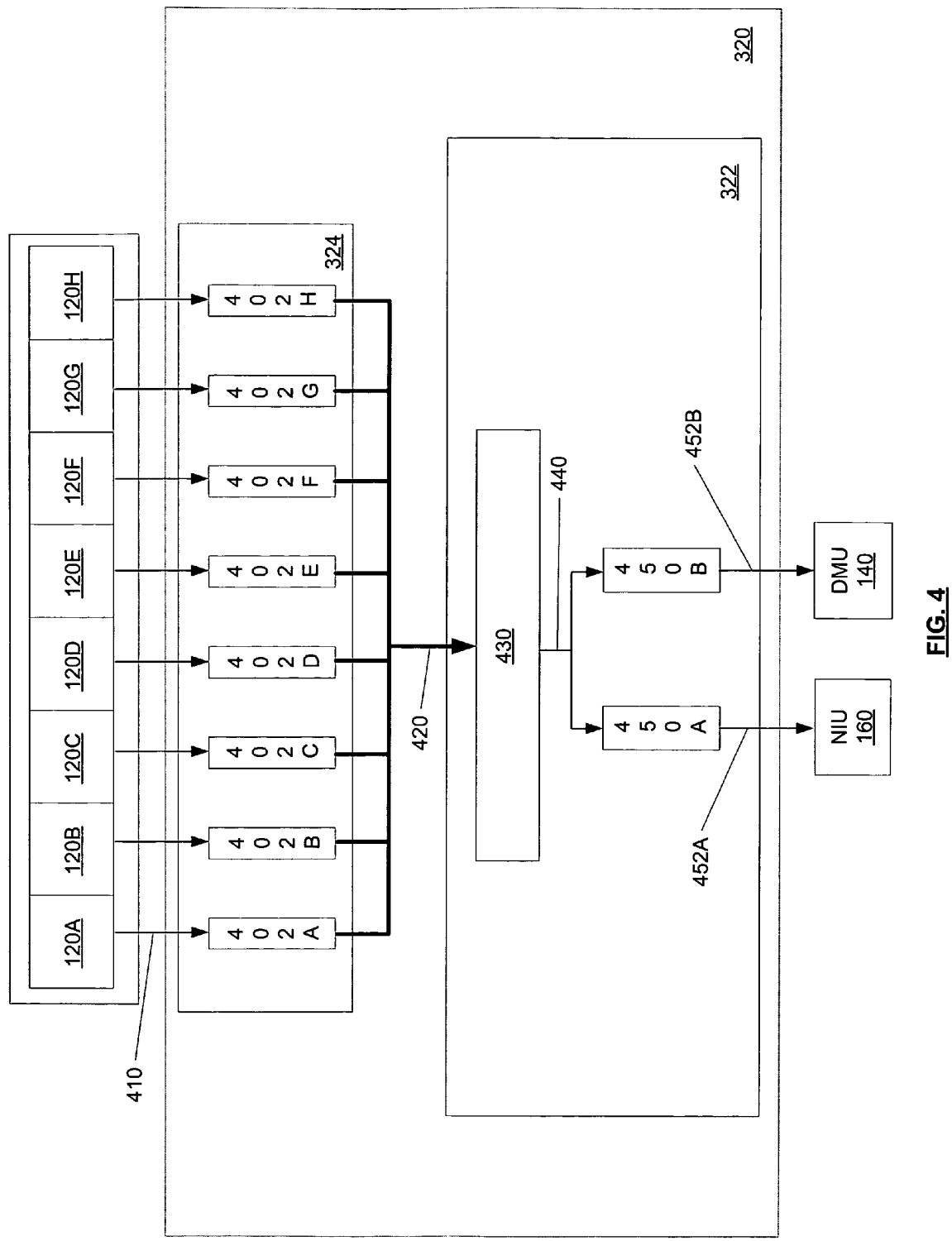
FIG. 4 depicts one embodiment of an outbound unit of the system interface unit of FIG. 2.

FIG. 4 illustrates one embodiment of SIO 320. As mentioned above, SIO 320 is generally configured to receive and convey packets which are outbound. Illustrated in FIG. 4 are L2 Cache banks 120A-120H, receive queue unit 324, and outbound queue unit 322. In the example shown, each L2 cache bank 120A-120H is coupled to convey data to a corresponding receive queue 402A-402H. Each of the receive queues 402 are coupled to convey data via bus 420 and control unit 430 to one of the outbound queues 450A or 450B via bus 440. Outbound queue 450A is coupled to convey data to NIU 160 via bus 160, and outbound queue 450B is coupled to convey data to DMU 140 via bus 452B. It is noted that each of queues 402 and 450 may be configured as multiple buffers in order to separately store header packets and corresponding data packets. Those skilled in the art will appreciate there are numerous ways to configure queues 402 and 450. All such configurations are contemplated.

In one embodiment, each of L2 cache banks 120A-120H may convey data to a corresponding queue 402A-402H via a 32 bit bus (e.g., bus 410). Therefore, in an embodiment where a 64 byte cache line is to be conveyed from an L2 cache bank 120, a header may be conveyed in a first clock cycle and corresponding data may be conveyed on sixteen subsequent clock cycles. Subsequent to receiving the data, a given queue 402 may then convey data via a 64 bit bus(es) 420 to control unit 430. While bus(es) 420 is depicted as a single bus, each queue 402 may in fact be coupled to control unit 430 via separate buses. Control unit 430 may then include multiplexing and other logic to select data from one of the queues 402 for conveyance to one of outbound queues 450 via bus 440. In one embodiment, bus(es) 420 may be 64 bits wide. Consequently, in one embodiment, conveyance of 64 bytes of data from a queue 402 to a queue 450 may include conveyance of a header packet followed by eight clock cycles of data. In one embodiment, control unit 430 also includes logic to examine received packet headers and determine in which queue, 450A or 450B, the corresponding data is to be stored. As noted above, in one embodiment, SIO 320 may be coupled to each of NIU 160 and DMU 140 via buses (452A-452B) which are 128 bits wide.

It is to be understood that the bus widths and clock cycles described herein are for purposes of discussion only. Other embodiments may utilize other bus widths. In addition, different portions of the system described herein may operate in different clock domains. For example, L2 cache 120 and receive unit 324 may operate in a processor clock domain, while outbound unit 322 may operate in a slower I/O clock domain. Numerous such alternatives are possible and are contemplated. In addition, while not discussed herein, data may include added error checking and/or correcting bits, and buses may be widened to accommodate such added data.

As discussed above, in one embodiment, inbound packets conform to a predetermined format. Such inbound packets include a header portion, and may also include a data portion where appropriate. In one embodiment, the size of the header portion of the inbound packet is chosen to be sufficiently large to accommodate the protocols which are utilized by the NIU 160 and the DMU 140. In other words, if the protocol utilized by the NIU 160 requires at least X bits to identify or otherwise describe a particular transaction, then the header portion of the inbound packet conveyed from the NIU 160 to the SIU 180 is at least X bits. It is noted that different communication protocols may require a different number of bits to adequately describe a particular transaction. Consequently, the size of the header portion of an inbound packet could vary depending upon the corresponding protocol and/or transaction. Such an approach is possible and is contemplated.

However, in one embodiment, a fixed size for the inbound packet header may be chosen. By using a fixed header size, implementation of the SIU 180 interface and packet processing circuitry may be simplified. In such a case, the header size chosen should be adequate to accommodate the "largest" header which may be needed in view of the protocols being used and the transactions which may be generated. In one embodiment, a packet header size may be chosen to be sufficiently large to accommodate not only the present needs of a given system, but also the needs of other (perhaps future unknown) protocols and transactions. Accordingly, the packet header size may be chosen to be larger than is needed for a particular system.

Figure 5:
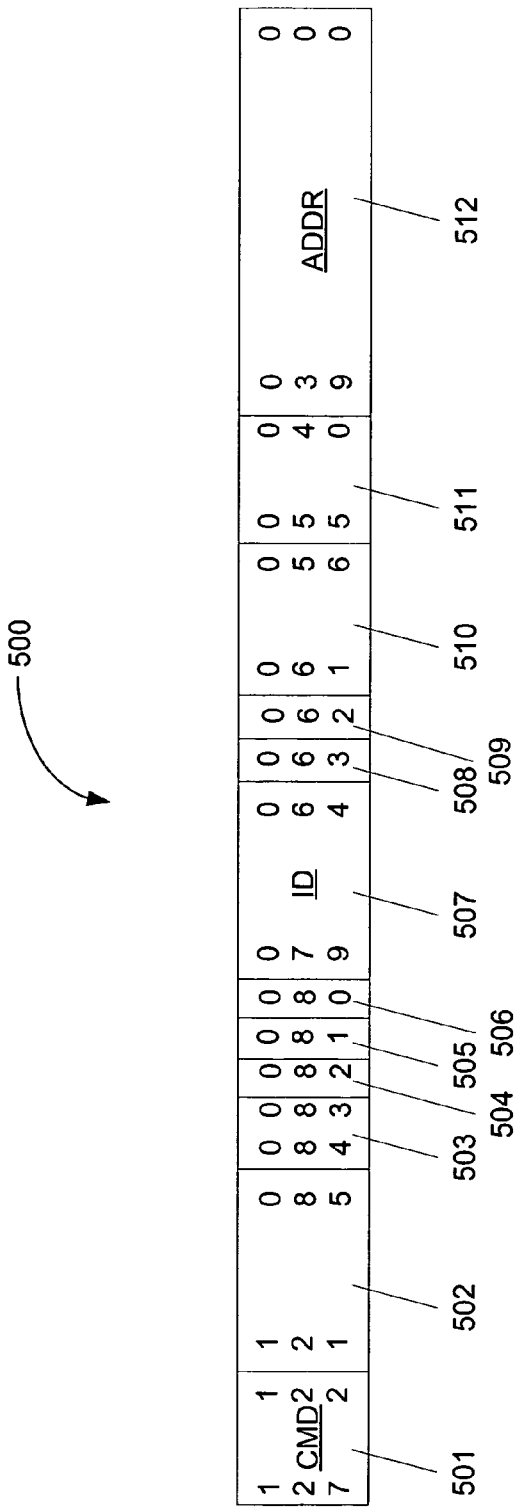
FIG. 5 illustrates one embodiment of a packet header.

FIG. 5 depicts one embodiment of a packet header 500 for use at the interface between the SIU 180 and each of the NIU 160 and DMU 140 which is chosen to be 128 bits in size. In the example depicted, various bits of the header may form fields which are dedicated for a given purpose depending upon whether the packet is inbound to the SIU 180 or outbound from the SIU 180. For example, in the event the header 500 corresponds to an inbound read request, field 512 (bits 0-39) may be used to indicate a read address. In one embodiment, reads may be aligned to a particular boundary as desired. For example, a read request may return a 64 byte cache line and the read address may be aligned to a 64 byte boundary.

In addition to a read address 512, the header 500 may also include an identifier (ID) field 507 (bits 64-79) which is used by the requestor (NIU 160 or DMU 140). The ID 507 may, for example, be used by the requester to match a response to the appropriate request. Also indicated in the example of FIG. 5 is a command (CMD) field 501 which may be used to identify the nature of the packet. For example, in the embodiment shown, the command field 501 includes six bits (bits 122-127). In one embodiment, each bit is used as a flag to indicate a different condition. One such example is provided in Table 1 below which also shows the corresponding bit settings for a read request.

TABLE 1

| Bit | Name | Setting |
|---|---|---|
| 127 | Response | 0 |
| 126 | Posted Request | 0 |
| 125 | Read | 1 |
| 124 | Write Bytemask Active | 0 |
| 123 | L2 | 1 |
| 122 | NCU | 0 |

In the example of Table 1, both the Read bit and L2 bits are set to indicate a read request to memory/cache is indicated. The Posted Request bit (bit 126) may be used when set to indicate that no response to the request is expected. The Write Bytemask Active bit (bit 124) may be used to indicate that a bytemask associated with a write is active. The Response bit (bit 127) may be used for outbound packets to indicate the packet is a response. Finally, the NCU bit (bit 122) may be used to indicate that the corresponding transaction is a non-cacheable transaction. For example, in one embodiment, an interrupt request or I/O completion may represent non-cacheable transactions. Of course, a wide variety of alternative command encoding may be utilized.

In addition to the command field 501, other bits of the header packet 500 may be used for other purposes as well. For example, in one embodiment, field 503 may be used to provide address parity for the address in field 512. In such an embodiment, bit 84 may be used for odd parity and bit 83 may be used for even parity. Field 504 may be used to indicate the packet has timed out. Field 505 may be used to indicate that the packet's address maps to a nonexistent, reserved, or erroneous address. Field 506 may be used to indicate the corresponding data (e.g., in a read response) contains an uncorrectable error. Field 509 may be used to provide parity for the command field 501. Finally, field 510 may be used to provide check bits for the ID field 507 (e.g., single error correcting-double error detecting). Other bits (i.e., fields 502, 508, and 511 may be reserved for other purposes.

Similarly, an inbound write request may utilize a header packet as shown in FIG. 5. For a write request, the command field 501 may have bits 127:122 set to "000010". In such a case, the L2 bit is set to "1" and the Read bit is set to "0". In one embodiment, a write request includes conveyance of a write header packet to the SIU 180 on a first cycle, followed by 16 bytes of data on each of the following four cycles. As with a read request, a write request may include in the header packet a write address 512 and an ID 507.

Figure 6:
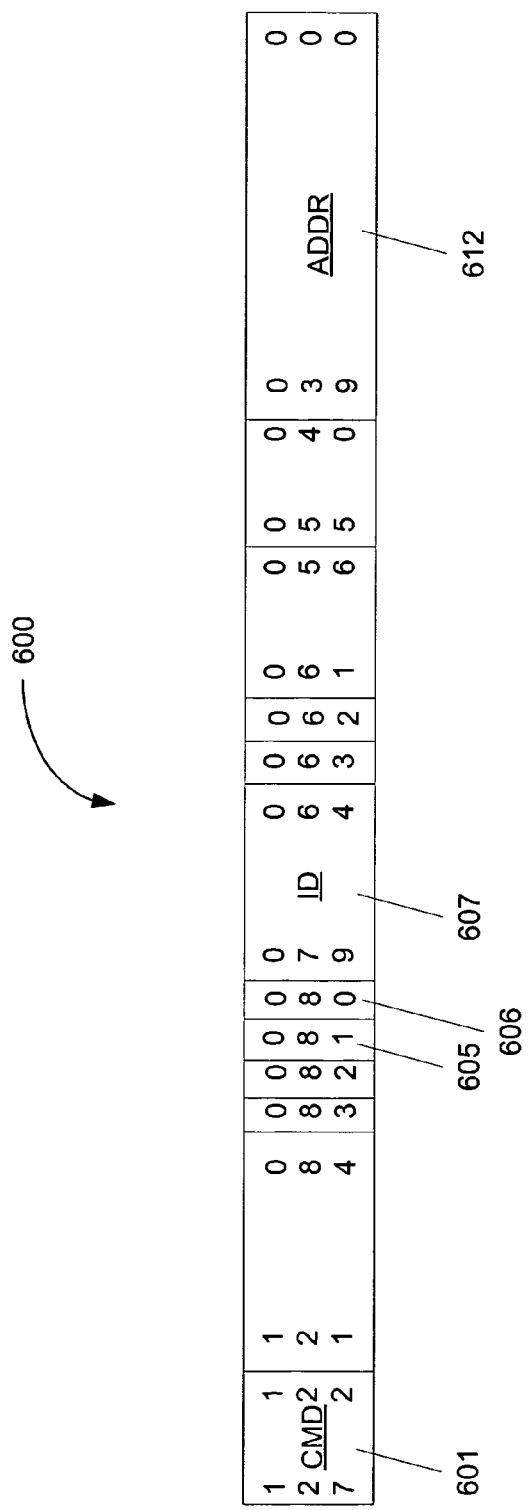
FIG. 6 illustrates one embodiment of a packet header.

FIG. 6 illustrates one embodiment of an outbound header packet which may be conveyed from the SIU 180 to one of the NIU 160 or DMU 140. In the example shown, a command field 601, ID field 607, and ADDR field 612 are provided which mirror the fields of the packet 500 shown in FIG. 5. As in FIG. 5, the command field 601 may include the same bits as those of field 501 in FIG. 5. For an outbound packet, the response bit (bit 127) may be set to "1" to indicate the packet corresponds to a read or write response packet. The ID 607 for an outbound response packet includes the ID originally supplied by the requestor (e.g., the NIU 160). Finally, the address field 612 may generally be ignored for an outbound packet. Upon receiving an outbound packet from the SIU 180, the original requestor (NIU 160 or DMU 140) may use the included ID 607 to match the received packet to a previously submitted request as appropriate. Field 605 may be used to indicate that the packet's address mapped to a nonexistent, reserved, or erroneous address. Field 606 may be used to indicate that the corresponding payload includes an uncorrectable error. Other bits of the outbound header packet may serve other purposes as desired.

As may be appreciated, in the embodiments shown above, the CMD, ID and ADDR fields of both the inbound packet 500 and outbound packet 600 are generally identical in placement and structure. Such uniformity in packets may further reduce the complexity of the packet processing circuitry.

Figure 7:
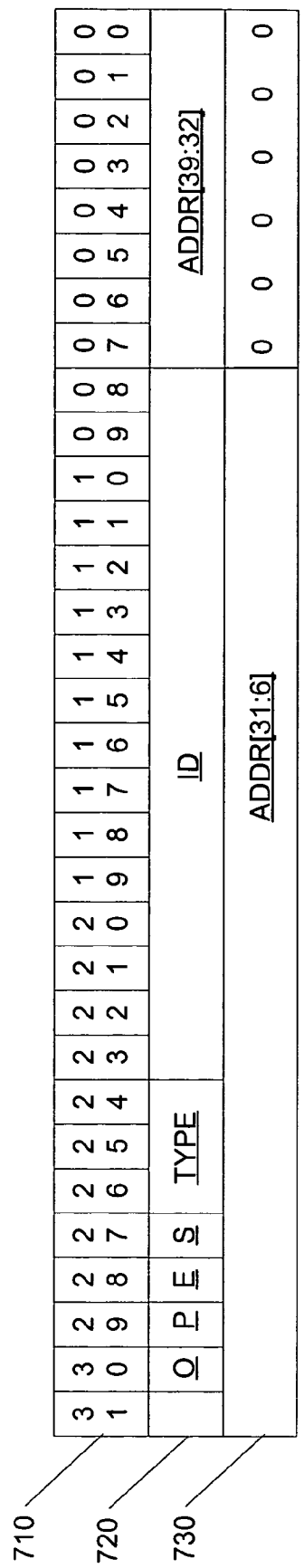
FIG. 7 illustrates one embodiment of a packet header.

Turning to FIG. 7, one embodiment of a header packet 700 which may be utilized at the SIU 180 and L2 120 interface is shown. As described above, in one embodiment, the bus interface between the SIU 180 and L2 Cache 120 may be 32 bits wide (not including additional parity or other error checking bits). In the example shown, bit positions of the header packet are indicated by a first row 710 of the table. In one embodiment, the header packet between the SIU 180 and L2 cache 120 comprises 64 bits which are conveyed on two consecutive clock cycles. In the embodiment shown, the first 32 bits (row 720) which are conveyed includes flags "O", "P", "E", and "S", a TYPE field, and ID field, and bits 39:32 of an ADDR. The ID included in the packet corresponds to the ID which originated with the requestor and includes the same ID information included in fields 507 and/or 607 of the previously described header packets (FIGS. 5-6). The TYPE field in FIG. 7 is used to indicate the type of transaction corresponding to the header packet.

The row 730 of the illustrated packet includes the remaining bits of the address, ADDR[31:0]. In the embodiment shown, the address is aligned to a 64 byte boundary and the eight least significant bits of the address (bits 7-0) are zero. Alternative embodiments may use different addressing schemes.

In the example shown, three bits (24-26) are included which provides for eight possible transaction types. In one embodiment, transaction types and encodings may include the following:

| Encoding | TYPE |
|---|---|
| 100 | Write Request |
| 010 | Write 8 |
| 001 | Read Request |

In the event the header packet 700 corresponds to a write transaction (e.g., encoding is 100 or 010), write data may then follow the header packet. For example, in one embodiment, an write transaction (100) may write 64 bytes of data. In such a case, four bytes of data may follow on 16 cycles subsequent to the corresponding header packet. Alternatively, a Write 8 transaction (010) may be configured to write fewer than 64 bytes of data. A Write 8 transaction may have an accompanying bytemask to indicate which bytes of data are to be written. In one embodiment, the bytemask may be encoded in the packet header (e.g., within the ID field of the packet header 700).

Figure 8:
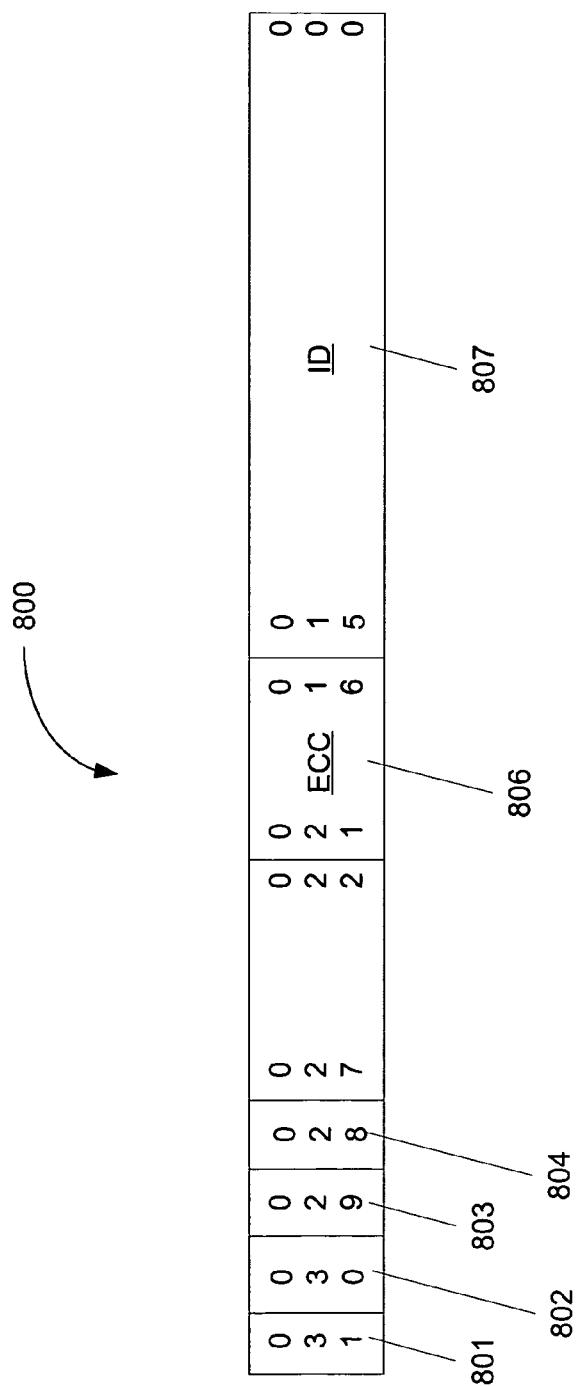
FIG. 8 illustrates one embodiment of a packet header.

FIG. 8 depicts one embodiment of a header packet 800 which may be conveyed from the SIU 180 to the NCU 170. Included in the packet 800 is an ID 807 which corresponds to an ID provided by the requestor (e.g., NIU 160 or DMU 140) for use in tracking the transaction as described above. Also included is an ECC field 806 which is used to provide ECC check bits for the ID 807. Additional bits which may be included are a bit 801 to indicate the packet has timed out, bit 802 to indicate the packet's address mapped to a nonexistent, reserved, or erroneous address, a bit 803 to indicate that the corresponding payload includes an uncorrectable error, and a bit 804 to indicate that the ID 807 includes an uncorrectable error. In an embodiment where the bus between the SIU 180 and NCU 170 is 32 bits wide, the transfer from the SIU 180 to the NCU 170 may comprise one cycle of header, followed by four cycles of payload data.

Figure 9:
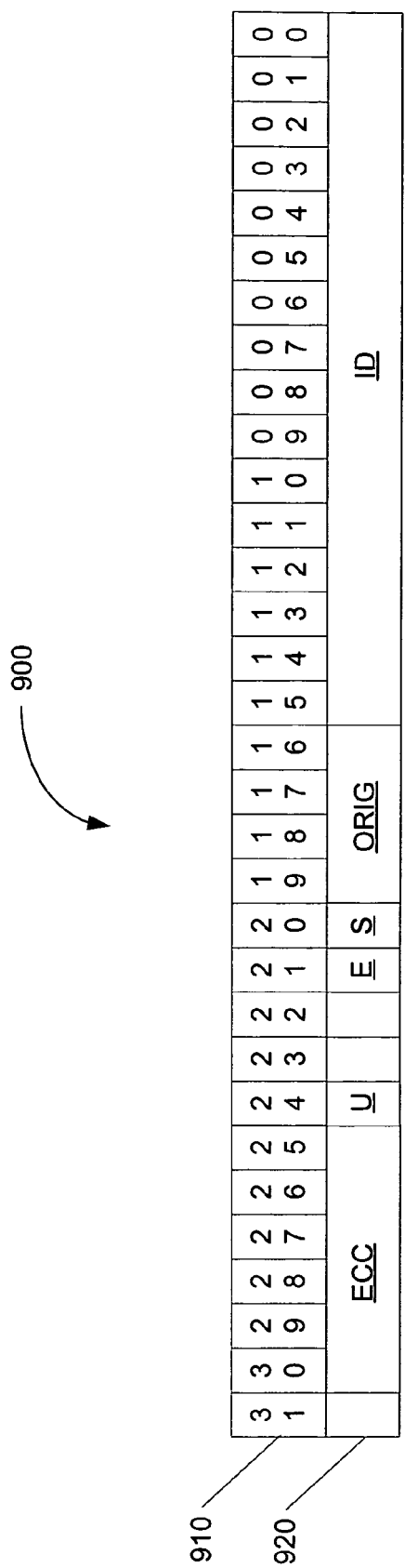
FIG. 9 illustrates one embodiment of a packet header.

FIG. 9 depicts one embodiment of a header packet 900 which may be used for conveyance from the L2 cache 120 to the SIU 180. Row 910 indicates bit positions in the header packet and row 920 illustrates the header packet 900 and its various fields. As shown, packet 900 includes an ID which is the identifier provided by the original requestor. The ORIG field may be used to indicate the original requestor. If the header packet 900 corresponds to a read response, then the ORIG field indicates the destination of the following payload. In one embodiment, the L2 cache 120 may generate a write invalidate response packet responsive to a write transaction which also invalidates any matching tag in the L2 cache array. In such an embodiment, the write invalidate response packet may be identified by setting the ORIG field to all zeroes.

For a read response, the header packet is followed by 64 bytes of payload. In one embodiment, the critical 32 bits of the read response are returned first and three bits of the ORIG field are used to identify the critical byte address from the original read request. Other fields included in the packet 900 of FIG. 9 may include a source field (S) which indicates the original requestor was the DMU 140 or the NIU 160. The E field may be used to indicate an error condition, the U field may be used to indicate an uncorrectable L2 error. Finally, the ECC field may include check bits for the data in the ID field.

Figure 10:
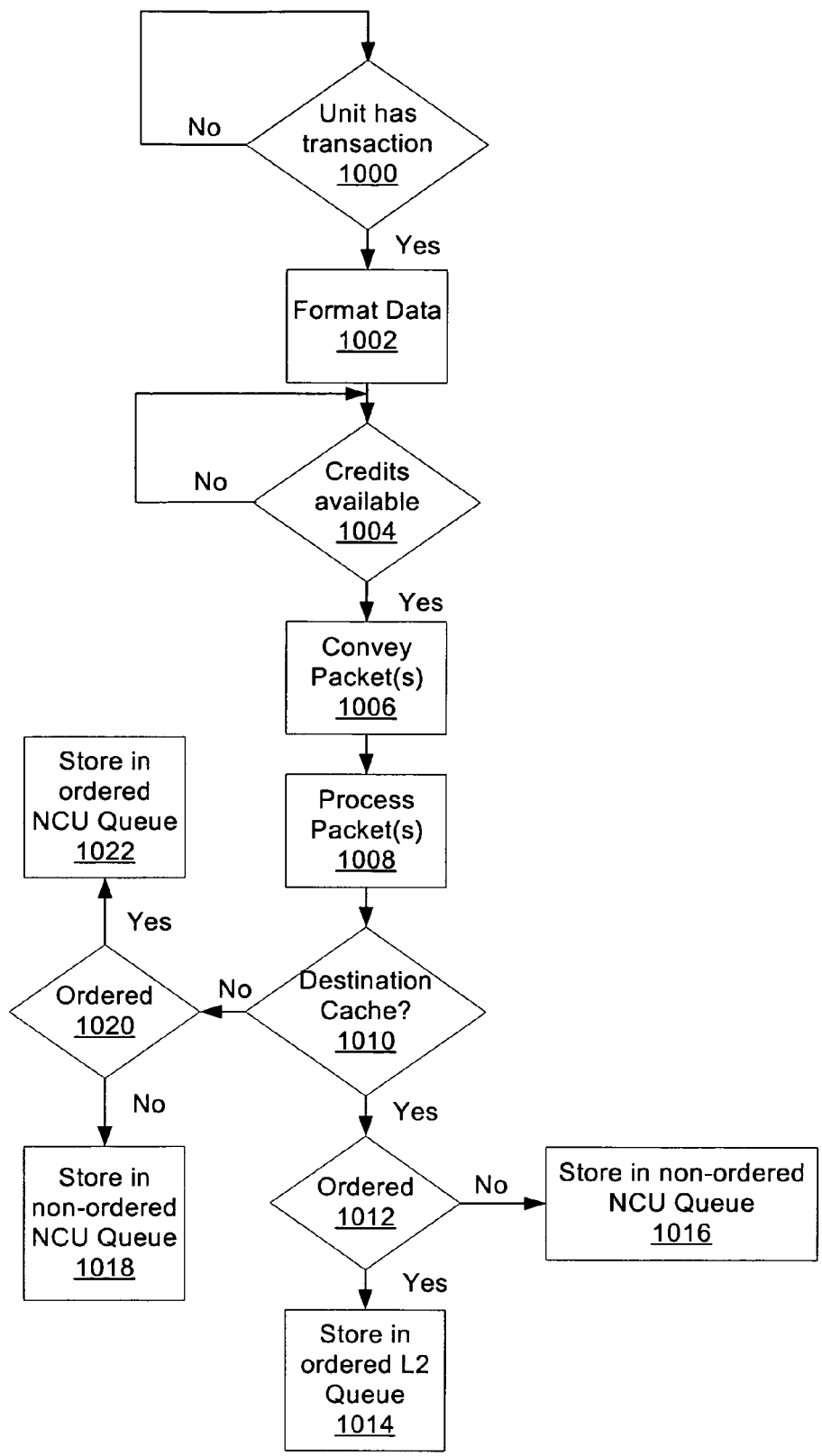
FIG. 10 illustrates one embodiment of a method for conveying and processing I/O transactions.

FIG. 10 depicts one embodiment of a method for receiving and processing packets in a system interface unit such as SIU 180 discussed above. For ease of illustration, only a single unit (e.g., NIU 160 or DMU 140) coupled to the system interface unit is described. Responsive to determining a transaction for conveyance to the SIU 180 is available or otherwise desired (decision block 1002), the transferring unit formats the transaction data to a predetermined common format (block 1002). As described above, such a format may include a commonly formatted header packet. In an embodiment which utilizes a credit based system for accessing the SIU 180, the initiating unit determines whether it currently has any credits available for conveying transaction data to the SIU 180 (decision block 1004). If no credits are currently available, then the process waits until such a time as credits are available. In response to determination credits are available, the initiating unit conveys the packet(s) to the SIU 180 (block 1006). The SIU 180 then processes the received header packet (block 1008) and determines whether the target is the memory/cache or is not cacheable (decision block 1010). If the target is the memory/cache and the header indicates the transaction is to be ordered (decision block 1012), corresponding data is placed in the ordered L2 cache queue (block 1014). If the target is the memory/cache and the header indicates the transaction is not to be ordered (decision block 1012), corresponding data is placed in the non-ordered L2 cache queue (block 1016).

Similarly, if the transaction is not cacheable (e.g., the target is the NCU 170) and the transaction is to be ordered (decision block 1020), corresponding data is placed in the ordered NCU queue (1022). If the transaction is not cacheable (e.g., the target is the NCU 170) and the transaction is not to be ordered (decision block 1020), then corresponding data is placed in the non-ordered NCU queue (1022).

Figure 11:
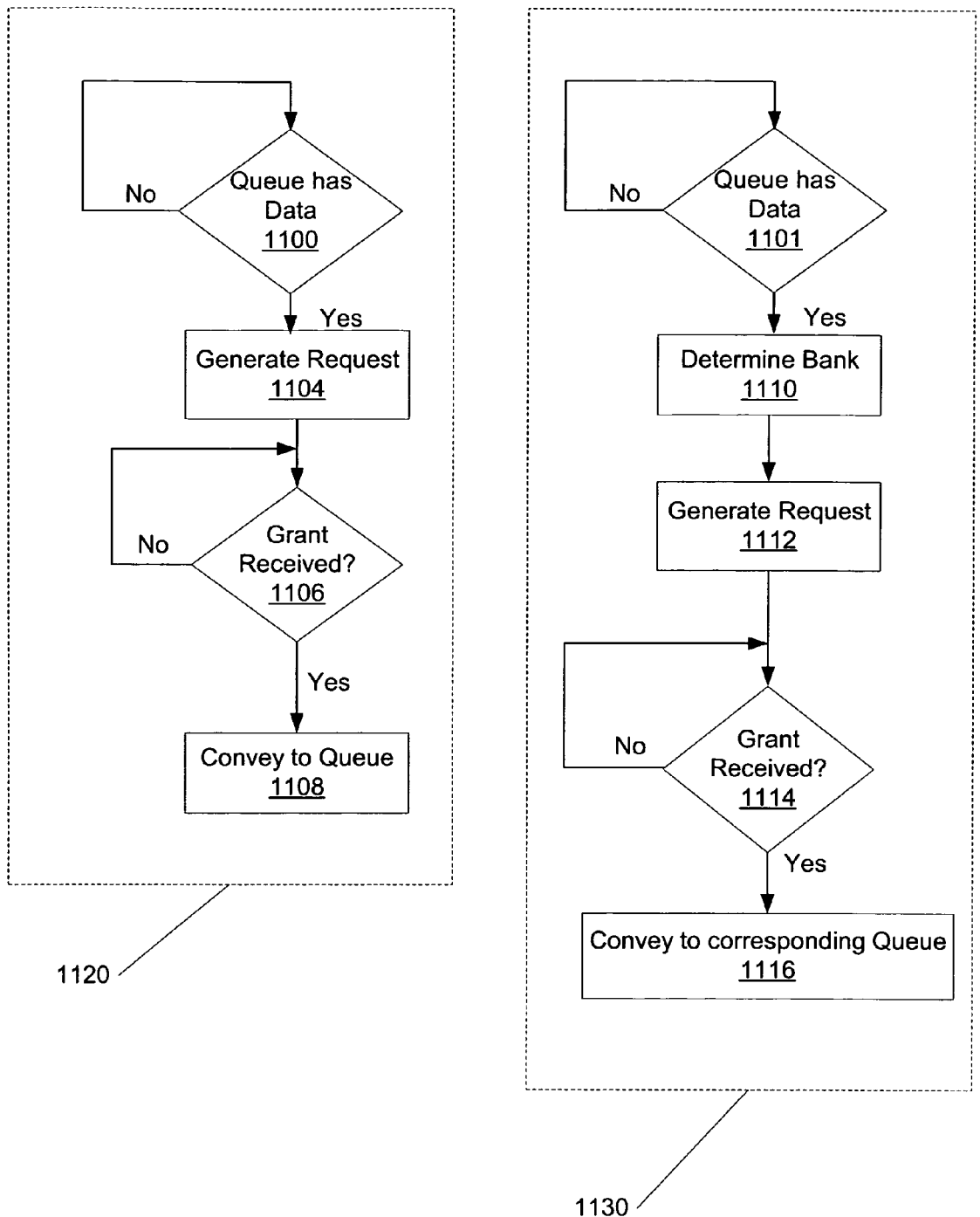
FIG. 11 illustrates one embodiment of a method for conveying transaction data to a queue corresponding to a non-cacheable unit or cache.

FIG. 11 illustrates one embodiment of a method for transferring data from the SIU inbound unit 312 to either the inbound L2 unit 316 or the inbound NCU unit 314. FIG. 11 depicts two processes which may generally operate concurrently. A first process corresponds to transfers to the inbound NCU unit 314 and the second process corresponds to transfers to the inbound L2 unit 316. Subsequent to an NCU queue 301 receiving data (decision block 1100), a request to the NCU unit 314 is generated (block 1104). When a grant is received from the NCU unit 314 (decision block 1106), corresponding data may be conveyed to the NCU queue 311. In the case of inbound data to the memory/cache, received data is detected (decision block 1101) and a determination as to the target L2 bank is made (block 1110). A request is then generated to the determined cache bank (block 1112). When a grant is received from the inbound L2 unit 316 (decision block 1114), the data is transferred to the corresponding queue.

Figure 12:
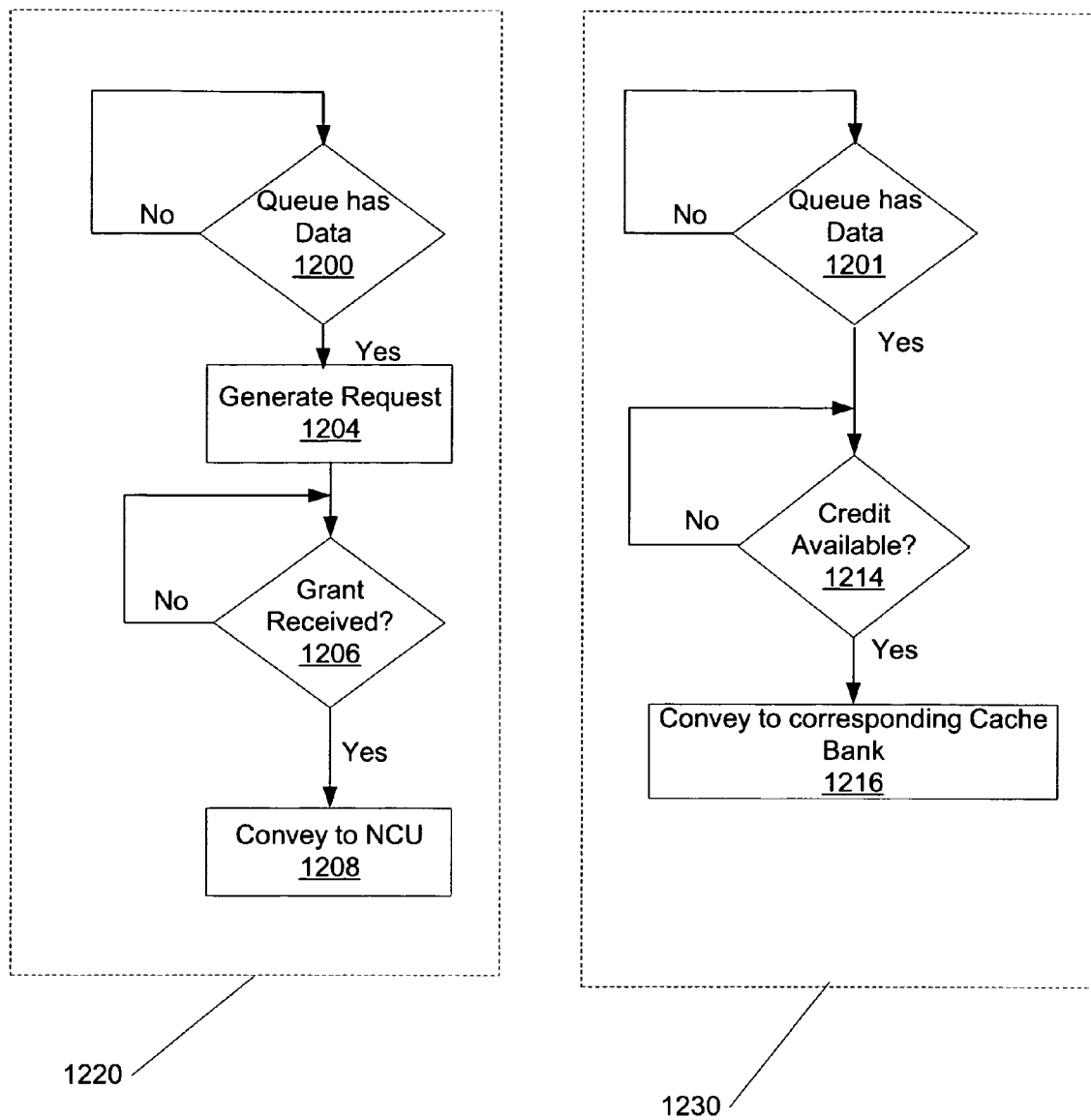
FIG. 12 illustrates one embodiment of a method for conveying transaction data to a non-cacheable unit or cache.

Finally, the transfer from the NCU unit 314 to the NCU 170, and the L2 unit 316 to the L2 cache 120 is shown in FIG. 12. Similar to FIG. 11, the processes depicted (1220 and 1230) in FIG. 12 may operate concurrently. In one embodiment, the transfers from the NCU unit 314 to the NCU 170 are request/grant based, and transfers from the L2 unit 316 to the L2 cache 120 are credit based. Other embodiments may utilize alternative approaches. In the example shown, the inbound NCU unit 314 detects data in its queue (decision block 1200) and generates a request (block 1204) to the NCU 170 for permission to transfer corresponding data. When a grant is received (decision block 1206), corresponding data is transferred from the inbound NCU unit 314 to the NCU 170 (block 1208).

As the process 1230 for the L2 unit 316 is credit based, the explicit requests and grants used by the inbound NCU unit 314 may not be used. Rather, as discussed above, when a queue has data to transfer (decision block 1201), the inbound L2 unit 316 may simply initiate the conveyance of data to the L2 cache 120 (block 1216) if a credit is available (decision 1214). As described above, the credit based system may entail the inbound L2 unit 316 maintaining a count which indicates a number of available credits. When a queue 313 within the L2 unit 316 conveys data, a count corresponding to the queue is decremented. When a bank of the L2 cache 120 frees an internal entry, or otherwise frees circuitry required for processing received data, the L2 cache 120 provides a signal to the inbound L2 unit 316 which causes the L2 unit 316 to increment the count for a corresponding queue. In this manner, the flow from the L2 unit 316 to the L2 cache 120 may be controlled.

What is claimed is:

1. A processor comprising:
a plurality of processing cores;
a cache comprising a plurality of banks; and
a system interface unit coupled to said processing cores and said cache, wherein
the system interface unit includes:
an inbound unit configured to receive inbound transactions from a first input/output (I/O) unit and a second I/O unit; and
an outbound unit configured to convey outbound transactions to either the first I/O unit or the second I/O unit;
wherein the inbound unit includes a plurality of queues;
wherein in a first operating mode, the processor is configured to store ordered transactions and non-ordered transactions in separate queues; and wherein the processor is configured to disallow processing of a first packet in a non-ordered queue until a second packet in an ordered queue has been processed, in response to detecting the first packet and second packet are addressed to a same location.

2. The processor of claim 1, wherein the first I/O unit utilizes a different protocol than the second I/O unit, wherein the first I/O unit and second I/O unit convey transaction data to the system interface unit using a common format, and wherein each of the first and second I/O units reformat transactions conforming to their respective protocols to conform to said common format prior to conveying corresponding transaction data to the system interface unit.

3. The processor of claim 2, wherein said common format comprises a fixed size header packet which includes a command field, an identifier field, and a target address.

4. The processor of claim 3, wherein the command field indicates a type of transaction, and the identifier field includes data provided by either the first or second I/O unit for use in identifying a response which corresponds to a transaction.

5. The processor of claim 2, wherein the first I/O interface comprises is configured to support an Ethernet network, and wherein the second I/O interface is configured to support a peripheral component interconnect (PCI) bus.

6. The processor of claim 2, wherein the first I/O unit and the second I/O unit are integrated with the processor in a single package.

7. The processor of claim 2, wherein flow control between each of the first and second I/O units and the system interface unit is credit based.

8. The processor of claim 1, wherein the inbound unit further includes first queues for storing non-cacheable transactions and second queues for storing cacheable transactions, wherein each of said second queues is coupled to a respective one of the plurality of banks.

9. The processor of claim 8, wherein the system interface unit further comprises a header decode unit configured to:
examine packet headers stored in said second queues; and
determine a bank of the plurality of banks to which an examined packet header is targeted.

10. The processor of claim 9, wherein the system interface unit further comprises a separate queue for each of the plurality of banks of the cache, and wherein the header decode unit is configured to route particular transaction data from the second queues to a particular one of the separate queues in response to determining a packet header corresponding to the particular transaction is targeted to a cache bank which corresponds to the particular one of the separate queues.

11. The processor of claim 1, wherein in a second operating mode, the processor is configured to store ordered transactions and non-ordered transactions in a same queue and treat both as ordered transactions.

12. The processor of claim 1, wherein in response to detecting the first packet and second packet are addressed to a same location, the processor is further configured to tag the first packet to indicate a dependency on the second packet.

13. A method in a processor comprising a plurality of processing cores, a cache comprising a plurality of banks, and a system interface unit coupled to said processing cores and said cache, the method comprising:
receiving one or more inbound transactions from a first input/output (I/O) unit and/or a second I/O unit,
in a first operating mode, storing ordered transactions in first queues and storing non-ordered transactions in second queues different from the first queues; and
disallowing processing of a first packet in a non-ordered queue until a second packet in an ordered queue has been processed, in response to detecting the first packet and second packet are addressed to a same location.

14. The method of claim 13, wherein the first I/O unit utilizes a different protocol than the second I/O unit, and wherein the first I/O unit and second I/O unit convey transaction data to the system interface unit using a common format, the method further comprising each of the first and second I/O units reformatting transactions conforming to their respective protocols to conform to said common format prior to conveying corresponding transaction data to the system interface unit.

15. The method of claim 14, wherein said common format comprises a fixed size header packet which includes a command field, an identifier field, and a target address.

16. The method of claim 15, wherein the command field indicates a type of transaction, and the identifier field includes data provided by either the first or second I/O unit for use in identifying a response which corresponds to a transaction.

17. The method of claim 15, wherein the first I/O interface comprises is configured to support an Ethernet network, and wherein the second I/O interface is configured to support a peripheral component interconnect (PCI) bus.

18. The method of claim 14, further comprising controlling flow between each of the first and second I/O units and the system interface unit using a credit based mechanism.

19. The method of claim 13, further comprising storing cacheable transactions in third queues and non-cacheable transactions in fourth queues, wherein each of the third queues is coupled to a respective one of the plurality of banks.

20. The method of claim 13, wherein in a second operating mode, the processor is configured to store ordered transactions and non-ordered transactions in a same queue and treat both as ordered transactions.

21. The method of claim 13, further comprising tagging the first packet to indicate a dependency on the second packet.

22. A processor integrated system interface unit comprising:
an inbound unit configured to receive inbound transactions from a first input/output (I/O) unit and a second I/O unit; and
an outbound unit configured to convey outbound transactions to either the first I/O unit or the second I/O unit;
wherein the inbound unit includes a plurality of queues;
wherein in a first operating mode, the inbound unit is configured to store ordered transactions and non-ordered transactions in separate queues; and
wherein the system interface unit is configured to disallow processing of a first packet in a non-ordered queue until a second packet in an ordered queue has been processed, in response to detecting the first packet and second packet are addressed to a same location.

23. The system interface unit of claim 22, wherein in response to detecting the first packet and second packet are addressed to a same location, the system interface unit is further configured to tag the first packet to indicate a dependency on the second packet.

* * * * *